Figure 1:
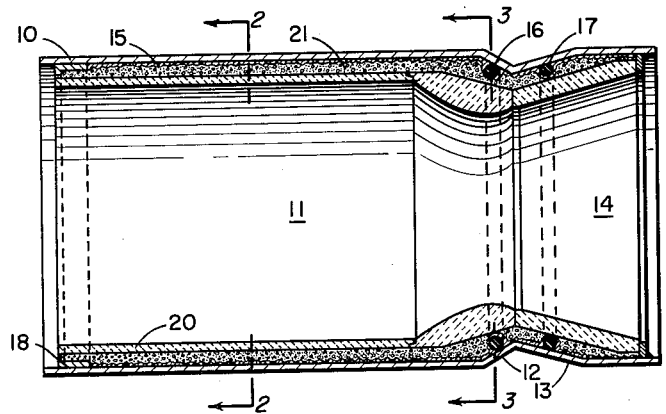

Oct. 9, 1962     R. F. KIMPEL ETAL     3,057,148
MEANS TO IMPROVE ADHERENCE OF LINING MATERIALS TO THE INNER
SURFACE OF COMBUSTION CHAMBERS OF ROCKET MOTORS
Filed Oct. 1, 1956

INVENTORS
ROBERT F. KIMPEL
ROBERT V. EVLETH
BY
ATTORNEY

United States Patent Office 3,057,148
Patented Oct. 9, 1962

3,057,148
MEANS TO IMPROVE ADHERENCE OF LINING MATERIALS TO THE INNER SURFACE OF COMBUSTION CHAMBERS OF ROCKET MOTORS
Robert F. Kimpel, Azusa, and Robert V. Evleth, West Covina, Calif., assignors to Aerojet-General Corporation, Azusa, Calif., a corporation of Ohio
Filed Oct. 1, 1956, Ser. No. 613,310
7 Claims. (Cl. 60—35.6)

Our invention relates to ceramic-lined rocket motor combustion chambers and has for an object to provide improved means for securing and maintaining insulation or lining material within the chamber.

A rocket motor commonly comprises a combustion chamber within a metal casing provided with an exhaust nozzle through which gases of combustion produced during operation are driven at high velocity. The gases are hot, especially within the chamber near the nozzle, so that direct contact of the gases with the metal casing rapidly deteriorates or may burn out the casing. To protect the casing from such deterioration from the gases, it is common to line the interior wall with a heat resisting material such as a ceramic. Such ceramic inner lining has been supported within the chamber casing wall by cement.

Since such ceramic lining and cementing materials are somewhat porous and also subject to formation of cracks or fissures during operation, it has been found that in many instances and under certain stringent operating conditions, enough of the pressurized hot gases of combustion may pass through the inner lining wall to form passageways for the gas in the cement behind the ceramic lining, thereby transmitting heat to the casing sometimes in amount sufficient to burn it through. Furthermore, this penetration of the liner by the gases has adversely affected the adhering properties of the cement, which tends to affect the liner adversely even to a greater extent.

In accordance with the present invention, means is provided for improving the adherence of the liner to the chamber wall. Before applying the cement, we prefer to provide a rough metal surface to which the cement will adhere tenaciously. This can be done by spraying a metal coating on the interior surface of the chamber, which will leave a roughened surface. Baffle rings additionally be provided at points at which the difference in pressure of the gases is greatest, these rings being embedded in the cement and the ceramic material being applied over the cement. The presence of the baffle rings coated with the cement and ceramic also provides a mechanical foundation which takes up mechanical stresses and excessive thermal conditions and thereby minimizes the destruction of cementing material.

A further feature of the invention resides in providing the retainer rings at the forward or injector end of the chamber, which rings act to aid in preventing removal of the cement behind the lining.

Figure 2:
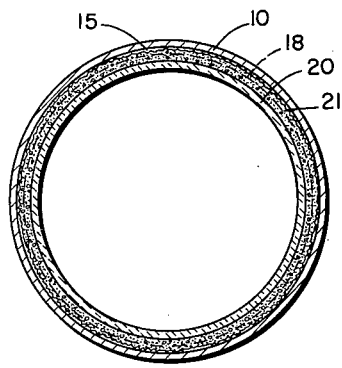
Figure 3:
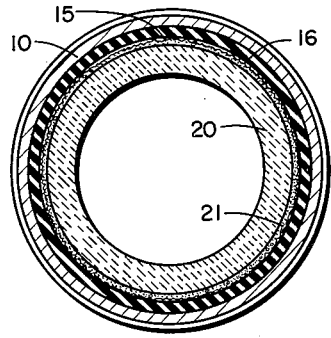
Figure 4:
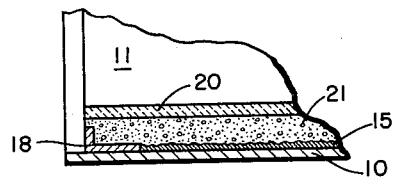

The foregoing and other features of the invention will be better understood from the following detailed description and the accompanying drawings, of which:

FIG. 1 is a longitudinal section of a rocket motor combustion chamber combining the several features of the invention, although they are not necessarily so combined;

FIG. 2 is a cross section on the line 2—2 of FIG. 1;
FIG. 3 is a cross section on the line 3—3 of FIG. 1; and
FIG. 4 is a cross section on a larger scale on the line 4—4 of FIG. 1.

Referring to the drawings, there is shown a cylindrical metal case 10 of an uncooled ceramic lined combustion chamber 11. The combustion chamber has conventional convergent and divergent sections 12 and 13, respectively. These sections form a nozzle or exhaust portion 14.

Preferably baffle rings 16 and 17 are continuously peripherally secured as by welding to the inner surface of the convergent and divergent sections adjacent the throat area where the pressure differential of the gases is greatest, and therefore where the formation of passages between a cement liner and casing is most likely to occur.

A sprayed metal rough coating 15 is preferably applied to the entire inner surface of the combustion chamber and over the baffle rings. Preferably, a relatively soft metal such as aluminum is used which has the advantage that if local hot spots with cracking develop in the cement, the metal may melt and flow into the cracks.

Between the metal case 10 and the inner ceramic lining 20, a layer of adhesive cement 21 is cast against the rough surface of the sprayed metal coating to which it adheres.

Since the cement at the forward end of the combustion chamber is subjected to particularly severe thermal and mechanical stresses and erosive action of burning gases, preferably an additional member in the form of a steel retaining ring 18 of L shaped cross section, is provided at the forward or injector end of the combustion chamber.

The retaining ring may be installed prior to or subsequent to the casting of the adhesive insulating cement before it has hardened and is held in place by the adhesion thereto of the cement. The shape of the ring protects the edge of the cement and acts to minimize damage thereto.

Both mechanical and thermal stresses press the cement insulation against the baffle rings 16 and 17 and tend to fill any openings that may have formed by movement of the hot combustion gases between the insulation and combustion chamber inner surface.

Tenacious adherence of the anchored lining is not only advantageous during, but also subsequent to, operation of the unit.

While preferred embodiments of the invention have been described and illustrated, it is to be understood that changes and modifications therein may be made by those skilled in the art without departing from the scope of the invention as defined by the appended claims.

We claim:

1. In a device of the class described, a stress bearing combustion chamber case, an adherent rough surfaced metal coating on the inside of said case, baffle rings continuously peripherally secured to the chamber case and covered by said inner coating, an intermediate layer of insulating cement on said adherent coating and baffle ring, and a ceramic innerlining covering said insulating cement.

2. In a device of the class described, a stress bearing combustion chamber case having a nozzle portion, an adherent rough surfaced metal coating on the interior of said case, a baffle ring continously peripherally secured to the sloped interior surface of said combustion chamber nozzle, an intermediate layer of insulation cement on said sprayed coating and said baffle ring, and a ceramic innerlining covering the cement.

3. In a device of the class described, a stress bearing combustion chamber case having a convergent-divergent nozzle portion, an adherent rough surfaced metal coating on the interior of said case, baffle rings continuously peripherally secured to the inner surface of the convergent and divergent sections of said nozzle portion of the combustion chamber case, an intermediate layer of insulating cement on the interior of the case surface and over said baffle rings and a ceramic lining covering said cement insulation.

4. A device of the kind described comprising; a stress bearing combustion chamber case having a convergent divergent exhaust nozzle portion; baffle rings continuously peripherally secured to the inner surface of the sloping portion of said nozzle portion, and a layer of adhesive insulation cement deposited over the inner surface of the case and nozzle portion and said baffle rings.

5. A device of the kind described comprising: a stress bearing combustion chamber case having a convergent divergent exhaust nozzle portion; baffle rings continuously peripherally secured to the inner surface of the sloping portion of said nozzle portion, a rough surfaced metallic coating deposited on the inner surface of said case and baffle rings; a layer of adhesive insulation cement deposited over the inner surface of said rough metallic layer; and a layer of ceramic material secured on said cement layer.

6. In a device of the class described: a stress bearing combustion chamber case; baffle rings continuously peripherally secured to the inner surface of the chamber case; an adherent rough surfaced metal coating on the inside of said case and over said baffle rings; a layer of insulating cement on said adherent coating and baffle rings, said coating being formed from a metal adapted to melt at local hot spots developed by cracks in said cement and flow into said cracks; and a ceramic inner lining covering said insulating cement.

7. In a device of the class described: a stress bearing combustion chamber case; baffle rings continuously peripherally secured to the inner surface of said chamber; a layer of insulating cement over the inside of said combustion chamber and said baffle rings; and a ceramic inner lining covering said insulating cement, said baffle rings being effective to prevent the development of gas channels in the cement layer and to resist stresses tending to deteriorate said cement layer.

References Cited in the file of this patent

UNITED STATES PATENTS

| | | |
|---|---|---|
| 2,658,332 | Nicholson | Nov. 10, 1953 |
| 2,699,036 | Nicholson | Jan. 11, 1955 |
| 2,706,382 | Logan et al. | Apr. 19, 1955 |

FOREIGN PATENTS

| | | |
|---|---|---|
| 580,598 | France | Sept. 4, 1924 |
| 459,924 | Great Britain | Jan. 18, 1937 |
| 705,847 | Great Britain | Mar. 17, 1954 |
| 143,421 | Sweden | Dec. 22, 1953 |